Oct. 21, 1924.

W. G. WILSON 1,512,871

VEHICLE SUSPENSION SPRING

Filed March 7, 1924

Inventor
W. G. Wilson
By Marks & Clerk Attys.

Patented Oct. 21, 1924.

1,512,871

UNITED STATES PATENT OFFICE.

WALTER GORDON WILSON, OF FARNINGHAM, ENGLAND.

VEHICLE SUSPENSION SPRING.

Application filed March 7, 1924. Serial No. 697,570.

*To all whom it may concern:*

Be it known that I, WALTER GORDON WILSON, a British subject, and residing at Charton, Farningham, in the county of Kent, England, have invented certain new and useful Improvements in and Relating to Vehicle Suspension Springs, of which the following is a specification.

This invention relates to spring suspension systems for vehicles, more especially those that are power driven.

The general system of springing a vehicle which is adopted comprises a pair of bowed laminated springs for use in connection with each axle. Thus the chassis supporting the car body has a four-point yielding support, and in determining the power and the precise form of these springs designers have usually adopted a compromise as regards the periodicity of vibration of the springs.

When considering the pitching movements of a vehicle, that is longitudinal rotation or movement of the chassis relatively to the front and rear axles, it is necessary to differentiate between pure pitching movements and pure vertical movements of the chassis relatively to the axle.

The object of the present invention is a spring suspension in which the pitching movements of the chassis are independent of, or separately controllable from, the vertical movement of the chassis on the springs.

The invention will now be described with reference to the accompanying drawings, in which:—

In carrying the invention into effect according to one embodiment and in order to control pitch movements of the chassis, a double set of springs $a$, $a$, and $b$, $b$, are arranged longitudinally under each side member of the chassis. For this purpose a pivotal bearing $c$ is suspended by bracket $d$ from each side member $e$ of the chassis and arranged about midway of the length thereof. On the pin $f$ of the pivotal bearing $c$ is mounted the boss $g^1$ of a longitudinal yoke $g$ from the front and back ends of which are extended the plate or leaf springs $b$, $b$, whose outer ends are suitably adapted, as shown, to ride upon the front and back axle respectively. This arrangement is hereinafter referred to as the primary support.

A pair of quarter elliptic laminated springs $a$, $a$ each extending inward from the front and back axle towards the centre of the chassis constitute a secondary support, and outer ends of the springs ride upon the respective front or back axle, while the multiple leaf inner ends are clipped or buckled rigidly as shown to the underpart of the chassis preferably at an equal distance on each side of the centre point from which the pivotal bearing depends.

By the foregoing arrangement the pitch movements of the chassis are absorbed by the secondary support and result in a slight pivotal movement around the pivotal centre $c$ of the primary support. All vertical movements of the chassis are absorbed by the springs $a$, $a$ and $b$, $b$, of both supports. Therefore by suitably designing the springs which form the primary and secondary supports, a definite value can be provided for "pitching" and a definite combined value allowed for vertical movements.

The plate springs $b$, $b$ may be replaced by other forms of springs, and one spring $b$ may have a different period from that of the other spring. The springs $a$, $a$ may also be of any preferred kind, semi- or full elliptic or helical.

Figure 1:
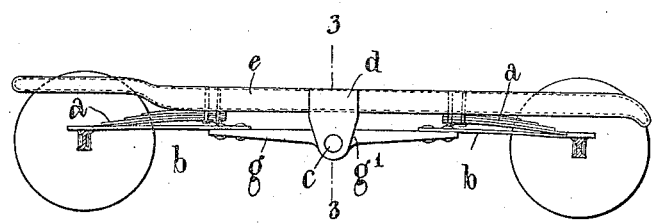
Figures 1 and 2 are respectively a side elevation and plan view of a chassis fitted with the improved spring suspension, the plan view being partly in section.
Figure 2:
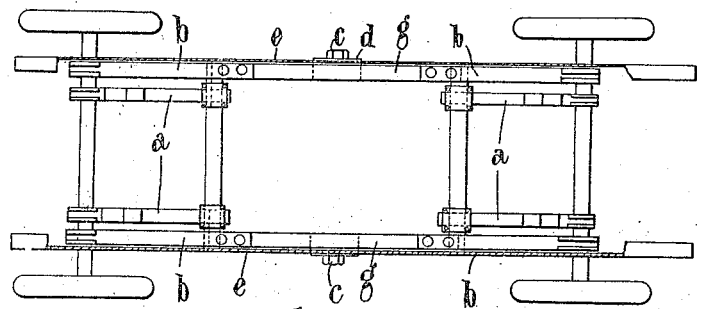
Figure 4:
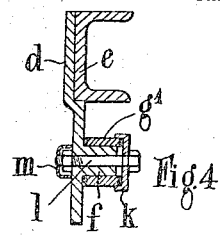
Figures 3 and 4 show alternative constructions of a pivotal support in section taken on the line 3—3, Figure 1.
Figure 3:
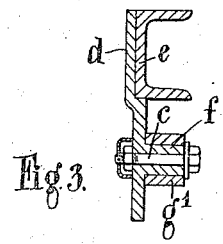

In connection with such a spring system, any suitable dampening means may be provided, for instance the pivotal bearing $c$ of the primary support may be constructed as shown in Figure 4. For this purpose the end faces of the boss $g^1$ of the yoke $g$ are fitted or formed with friction surfaces and a friction sleeve $h$ is provided to fit against one end of the boss, it being carried for this purpose upon one end of a bolt $l$ passing through the boss. When the nut $m$ upon the other end of the bolt is screwed up, the friction sleeve $h$ may be drawn with more or less force so as to exert any desired pressure upon the end faces of the boss, thereby obtaining the right degree of dampening.

It is to be understood that the spring for the secondary supports may comprise half elliptic, cantilever or other springs.

According to a modified design, the pivotal connection between the chassis and the primary support may be arranged out of the centre, that is towards either the front or the rear. Whichever side it is arranged on a second yielding support is symmetrically arranged at the other side of the centre to extend from the chassis and rest upon the primary support. This may be a helical or other form of spring.

The suspension system above described may be combined with spring or other forms of axles.

Having now described my invention what I claim as new and desire to secure by Letters Patent is:—

1. Improved spring suspension system for vehicles comprising the combination with a chassis to be carried upon a front and rear axle, of a longitudinal spring member arranged beneath and adjacent each side member of the chassis and resting at its ends upon the front and rear axles forming a primary support, and a pair of springs each having one end resting upon the front and back axle respectively, their other ends being attached to the chassis to form a secondary support, the combined effect of which supports will absorb vertical movement of the chassis, whilst the secondary support will absorb the fore and aft, that is pitch movements, such arrangement permitting definite relative spring values to be chosen for the respective supports.

2. In a spring suspension such as claimed in claim 1, the primary support comprising a central longitudinal yoke $g$ adjacent and beneath each side member of the chassis, and a leaf spring extended from the end of each yoke and resting upon the front or back axle respectively, the springs at each end of a yoke having the same period.

3. In a spring suspension such as claimed in claim 1, the primary support comprising a central longitudinal yoke $g$ adjacent and beneath each side member of the chassis, and a leaf spring extended from the end of each yoke and resting upon the front or back axle respectively, the springs at each end of a yoke having relatively different periods.

4. In a spring suspension as claimed in claim 1, the primary support comprising a central longitudinal yoke $g$ for each side member of the chassis, a pivotal support for each yoke on its respective chassis member and upon which support it may rock, and means for damping such rocking movement.

5. In a spring suspension as claimed in claim 1, the primary support comprising a central longitudinal yoke $g$ for each side member of the chassis, a pivotal support for each yoke on its respective chassis member and upon which support it may rock and means for applying a variable lateral frictional pressure at the pivotal support upon each yoke so as to obtain a predetermined degree of damping.

6. Improved spring suspension system, comprising the combination with a chassis to be carried upon a front and rear axle, of a yoke $g$ for each side member of the chassis, means for pivotally supporting the centre of each yoke to the corresponding member of the chassis, a leaf spring extending from each end of each yoke and resting upon the front or back axle respectively, means in connection with each pivot to damp the oscillations of each yoke, a pair of laminated springs each connected by one end to one end of the chassis side members, and a second pair of laminated springs each connected by one end to the other end of the chassis side members for the purpose described.

In testimony whereof I have signed my name to this specification.

WALTER GORDON WILSON.